United States Patent

Auger

(10) Patent No.: US 7,728,249 B2
(45) Date of Patent: Jun. 1, 2010

(54) ARRANGEMENT OF A STRESS TRANSDUCER ON ONE ARM OF WELDING PLIERS, AND METHOD FOR MOUNTING SAID STRESS TRANSDUCER

(75) Inventor: Patrice Auger, Beynes (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 313 days.

(21) Appl. No.: 11/571,263

(22) PCT Filed: Jun. 27, 2005

(86) PCT No.: PCT/FR2005/050503

§ 371 (c)(1), (2), (4) Date: Dec. 22, 2006

(87) PCT Pub. No.: WO2006/003346

PCT Pub. Date: Jan. 12, 2006

(65) Prior Publication Data

US 2007/0215579 A1    Sep. 20, 2007

(30) Foreign Application Priority Data

Jun. 28, 2004    (FR)    ................................. 04 07055

(51) Int. Cl.
*B23K 37/02*    (2006.01)

(52) U.S. Cl. .................................... 219/86.51

(58) Field of Classification Search ............ 219/86.51; 248/226.11, 227.4, 228.4, 228.5, 228.7, 230.1, 248/230.9
See application file for complete search history.

(56) References Cited

U.S. PATENT DOCUMENTS

| | | | | |
|---|---|---|---|---|
| 3,244,392 | A * | 4/1966 | Sheets | 248/230.8 |
| 5,434,382 | A | 7/1995 | Schlattl et al. | |
| 2003/0066366 | A1* | 4/2003 | Buck et al. | 73/866.5 |
| 2003/0106974 | A1* | 6/2003 | Guertin | 248/309.1 |
| 2003/0173484 | A1* | 9/2003 | Hsieh | 248/291.1 |
| 2003/0189139 | A1* | 10/2003 | Rasmussen et al. | 248/68.1 |
| 2005/0029416 | A1* | 2/2005 | Buck et al. | 248/200 |

FOREIGN PATENT DOCUMENTS

| | | |
|---|---|---|
| DE | 10144731 A | 4/2003 |
| EP | 0969265 A | 1/2000 |
| FR | 2631866 A | 12/1989 |
| FR | 2631866 A | 12/1998 |

* cited by examiner

*Primary Examiner*—Tu B Hoang
*Assistant Examiner*—Lindsey C Teaters
(74) *Attorney, Agent, or Firm*—Nicolas E. Seckel

(57) ABSTRACT

An arrangement of a stress transducer (8) mountable on one arm (31) of welding pliers, wherein an insert (10) is positioned between the arm (31) of the pliers and the stress transducer (8). A method for mounting said stress transducer is also provided.

20 Claims, 4 Drawing Sheets

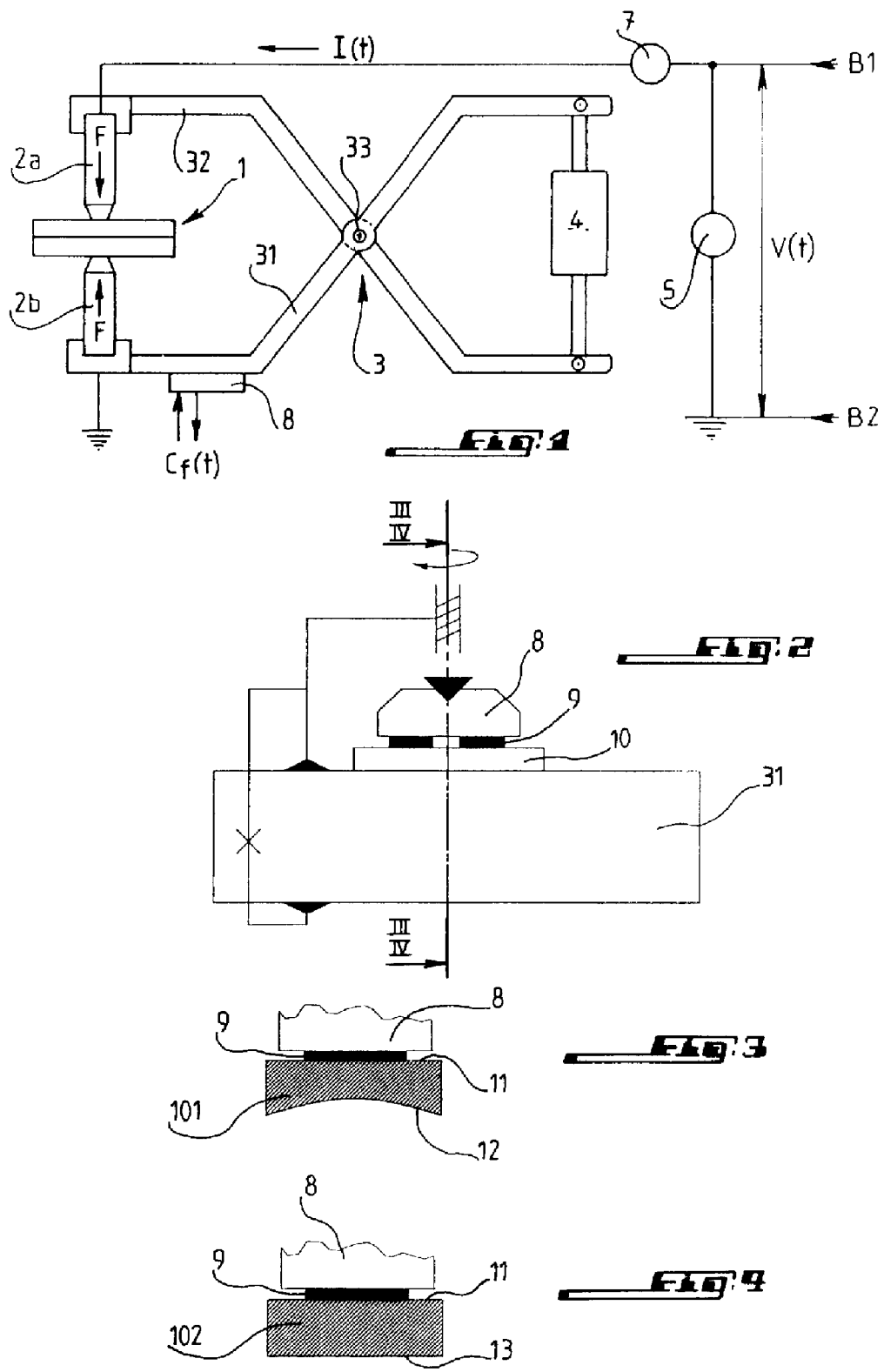

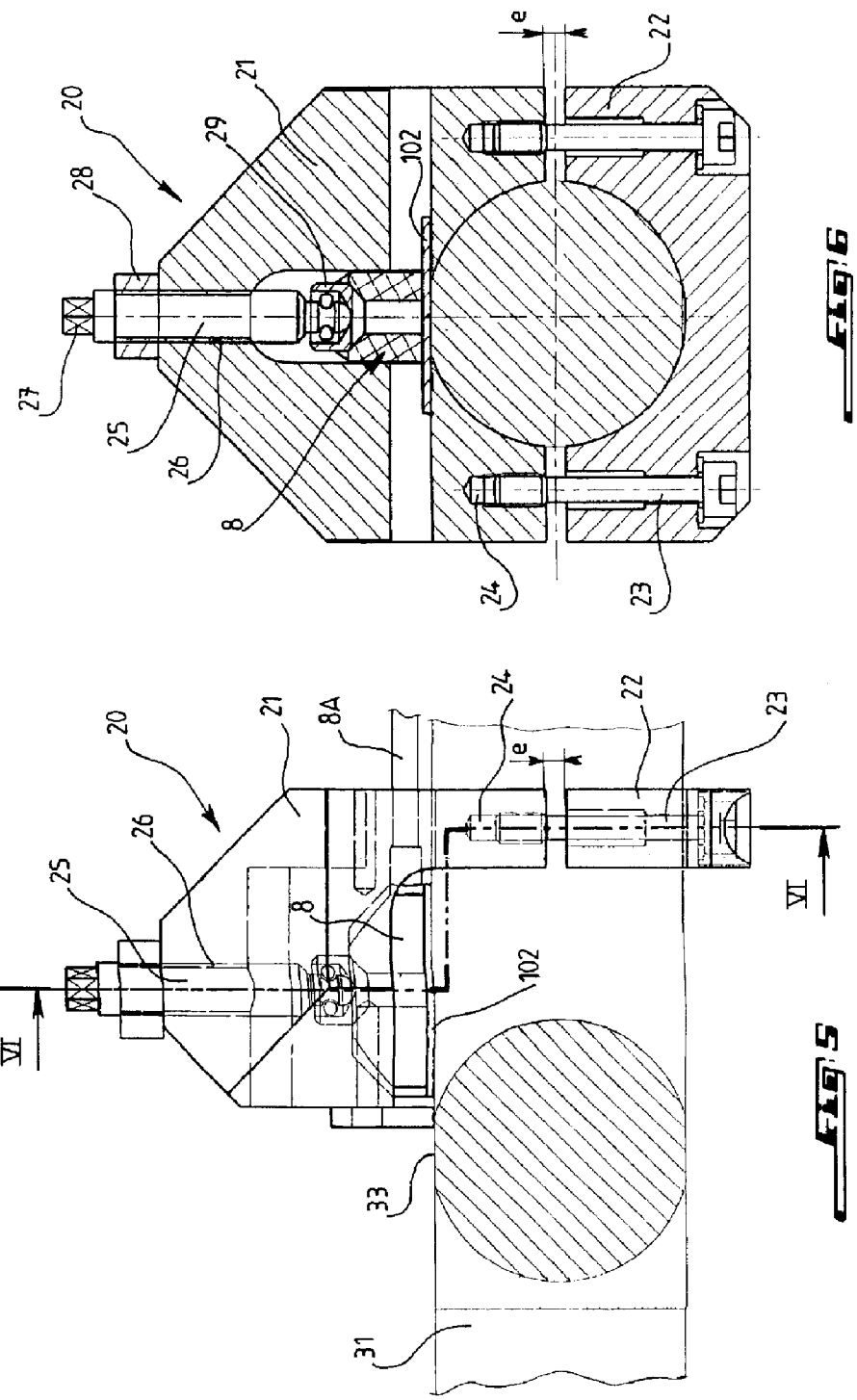

ARRANGEMENT OF A STRESS TRANSDUCER ON ONE ARM OF WELDING PLIERS, AND METHOD FOR MOUNTING SAID STRESS TRANSDUCER

The invention concerns an arrangement of a stress transducer intended to be mounted on an arm of welding pliers, as well as a method of mounting such a stress transducer.

Current vehicles are, for the most part, assembled by electric spot-welding. During assembly of the bodies, the means for controlling the quality of the assemblies used are nowadays the control of the welding parameters of the welding means, accompanied by controls performed by manual probing in the assembly lines or by a statistic destructive control outside of the assembly lines.

Resistance welding of a pile of metallic parts in general, and resistance welding with two electrodes and resulting in electric welding spots in particular, operate according to the principle that at least one heating electrode is used, which is contacted with the pile of parts to be welded, a force is applied by the electrode to the parts to be welded, and an electric current is passed through this electrode, the electric current then passing through the parts to be welded. According to the type of welding selected, a mobile electrode is used, which is applied to the parts to be welded, the other electrode being then constituted by the one among the metallic parts that is the farthest from the mobile electrode. According to another type of welding, two mobile electrodes are used, a force is applied by the electrodes to the parts to be welded in order to clamp them between the electrodes, and the current is passed through the parts to be welded.

Such a spot-welding operation requires a determination, for each type of part to be welded, essentially as a function of the nature and of the thickness of the parts to be welded, of how certain welding parameters must evolve as a function of time to obtain a minimal welding time. The welding apparatus is then adjusted as a function of the determined parameters.

This manner of operating has the consequence that the time required to perform a welding spot is always the same for a given type of parts. However, in large mass production, as is the case in the automobile industry, several thousands of welding spots can be present for a single vehicle. Thus, there is a marked interest in ensuring that the monitoring of the welding parameters selected to evaluate continuously the welding quality is reliable, and in particular, is not skewed by effects generated by one or the other of the elements forming the welding apparatus.

Indeed, one of the welding parameters that is monitored continuously, and whose evolution with time makes it possible to make conclusions as to the quality of the welding spots, is the clamping force applied by the welding pliers to the parts to be welded. Thus, threshold values of said clamping force are established, for example according to a process for optimizing the duration of each welding operation described in the document FR-A-2 631 866, by preliminary tests as a function of the type of parts to be welded, the clamping force is measured during the welding cycle, and certain welding operations are controlled when the measured force crosses the corresponding threshold values. More particularly, a first threshold value is established during the phase of force increase, and the electric current is passed through the electrodes when the measured force goes over this first threshold value. A second threshold value indicative of a satisfactory welding quality is also established, and it is checked during passage of the current whether the clamping force crosses this second threshold value. And finally, a third threshold value is established during the phase of force reduction, in which an order to move the welding robot can be given so that this movement takes place as soon as possible after the opening of the electrodes. This movement order will be given when the measured force crosses the third threshold value.

The example above of monitoring the welding quality during the performance of welding operations shows the importance of the reliability of the values measured in real time for a correct exploitation of the signals emitted by the force sensors fixed on the pliers arms during welding.

To evaluate the forces applied by the welding arms, the signal emitted by a piezoelectric sensor fixed on the pliers arms is exploited. However, a phenomenon of volumic expansion of the welding spot returns additional forces to the pliers arms. In other words, for a same force applied by the mechanism of the welding pliers to the parts to be welded, the signal emitted by the piezoelectric sensor can vary as a function of the volumic expansion phenomenon.

The objective of the invention is to propose means for fixing a force sensor on an arm of welding pliers, which are capable of improving the reliability of the electric signals emitted by the force sensors during a welding operation.

The objective of the invention is reached with an arrangement of a force sensor on a pliers arm, according to which an interposed part is disposed between the pliers arm and the force sensor.

This solution relies on the following thoughts.

The portion of the pliers arms on which a force sensor is mounted, is generally made of copper and is thus comparatively soft. Contrary to that, the casing of the force sensor is in a material harder than copper. In addition, the casing of the sensor is in general equipped with several support blocks. Since the sensor is applied to the arm with a certain force, when the arm is deformed, the sensor risks sinking more or less into the arm, thus skewing the measurement results.

To avoid this phenomenon, or at least to reduce its impact, an interposed part is used, whose hardness is lower than that of the sensor casing, but higher than that of the copper of the welding arm, and whose width is sufficient for the stability of the measurement. This interposed part has no mechanical connection with the support of the sensor.

Advantageously, the hardness of the interposed part is in the order of 350 to 450 $Hv_{0.3}$, preferably about 400 $Hv_{0.3}$.

As will be described more in details in the description of an embodiment of the invention, the sensor must not be fixed on the welding arm by screws, but only by clamping. The clamping is obtained with a support having a general shape of a collar encircling both the welding arm and the sensor.

In order to obtain the best support possible of the sensor on the welding arm, the interposed part is an essentially flat element having two opposed mounting faces, the first of which is intended to be contacted with the welding arm and the second of which is intended to be contacted with the sensor. Each of these two mounting faces has a shape complementary to the shape of the welding arm and of the sensor, respectively, to obtain, as the case may be, a shape adaptation between the welding arm and the sensor. Indeed, the sensor casing has a substantially flat support face, and the small thickness of the support blocks, which is in the order of about 0.5 mm, does not have much influence on this aspect. Contrary to that, the portion of the pliers arm on which the sensor must be mounted can be found, which corresponds to a welding arm having a circular cross-section, or slightly flattened, which corresponds to a welding arm having a flat. Consequently, the second mounting face of the interposed part is either plane, or concave with a radius of curvature equal to that of the pliers arm.

According to a particular embodiment of the support, this support is formed so as to enable an orientation of the sensor and of the interposed part during mounting thereof.

The interposed part is shaped, either specifically for each diameter of the pliers arm, or in a manner adaptable to several diameters of the pliers arms.

The objective of the invention is also reached with a method of mounting a force sensor on a pliers arm. According to the invention, this method comprises at least the following steps:

preparing the surface of the pliers arm in the location where the sensor will be disposed, placing an interposed part in the mounting location, placing the sensor on the interposed part, fixing the interposed part and the sensor on the pliers arm with a fixation element.

This fixation element is advantageously a support in the form of a collar shaped so as to immobilize the sensor and the interposed part on the pliers arm, only through a supporting force.

Other characteristics and advantages of the present invention will appear from the following description of an embodiment of the invention. This description is made with reference to the drawings in which:

FIG. 1 is a schematic partial view of a welding apparatus with a force sensor on one of the arms;

FIG. 2 shows schematically the disposition of a force sensor on a pliers arm;

FIG. 3 and FIG. 4 show the disposition of FIG. 2 in an axial view for two different types of welding arms;

FIG. 5 shows in a lateral view a support for fixing a sensor on a pliers arm, the pliers arm being equipped with a flat;

FIG. 6 shows a transverse cross-section along line VI-VI of FIG. 5;

Figure 8:
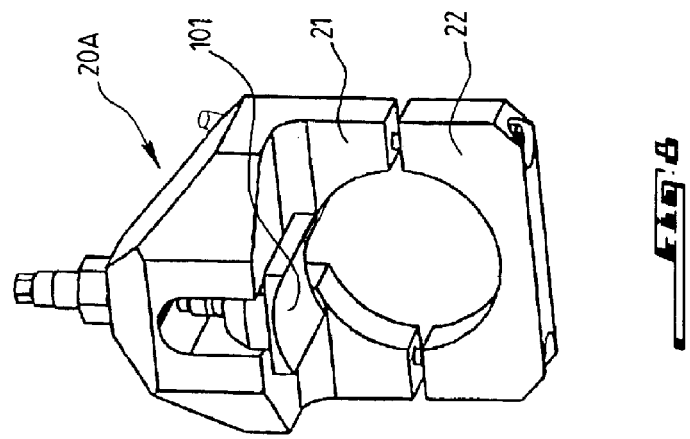
Figure 7:
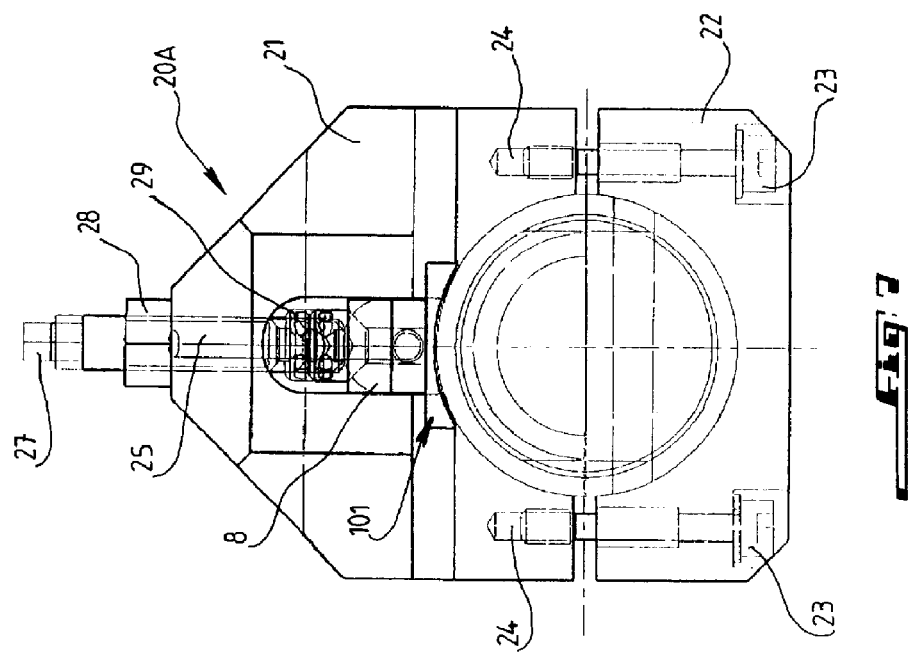
Figure 10:
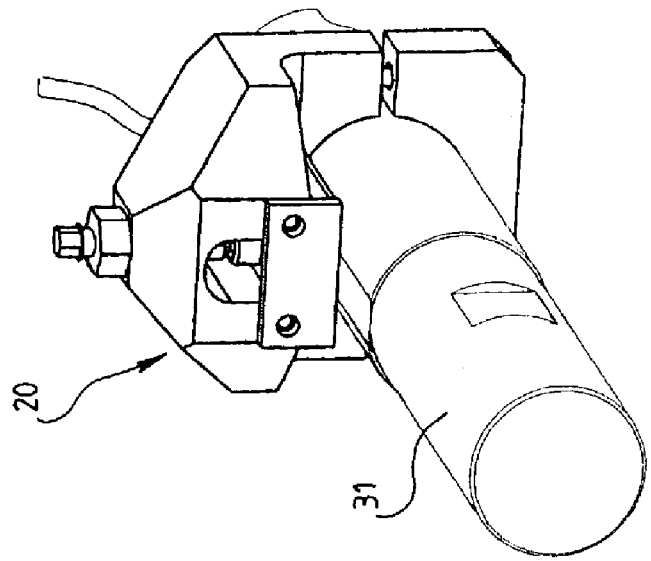
Figure 9:
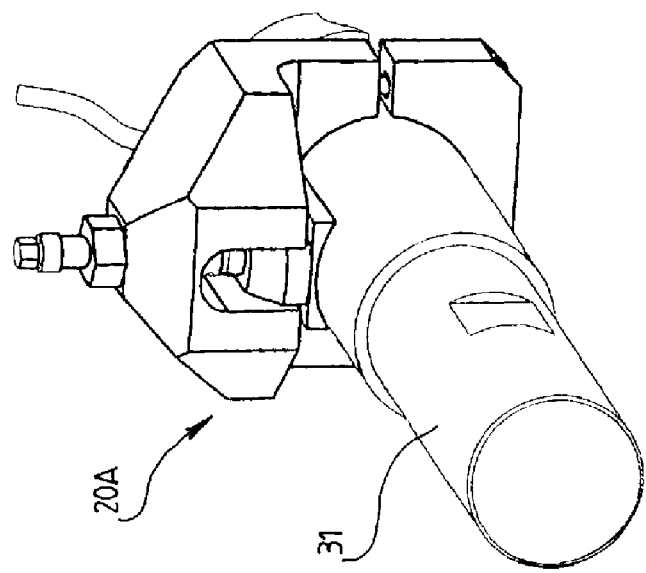

FIGS. 7 and 8 show a support in axial view and in perspective, respectively, for fixing a sensor on a pliers arm having a circular cross-section; and FIGS. 9 and 10 show the support of FIGS. 6 and 7, respectively, mounted on the pliers arm.

In a method of resistance welding, the metallic parts to be welded form together a pile 1 (FIG. 1), and are clamped between the two electrodes 2a, 2b, to which pliers 3, actuated by a cylinder 4, apply a clamping force F. The welding pliers 3 comprise two arms 31, 32 connected to each other in a pivotable manner by a hinge spot 33. A source of tension represented by its terminals B1, B2, supplying a tension V(t), variable as a function of time t and measurable by means of a voltmeter 5, is connected to the electrodes 2a, 2b.

The tension V(t) is advantageously applied in the form of a series of periodic impulses generating the apparition of a welding current having an intensity I(t), variable as a function of time t and measurable by means of an ampmeter 7. The application of the tension V(t) is controlled by a monitoring and control device as a function of input signals that the monitoring and control device receives from a force sensor 8 mounted on one of the arms 31, 32 of the welding pliers 3. In the version shown on FIG. 1, the sensor 8 is fixed on the arm 31.

The surveillance of the clamping force F is performed by measuring, preferably before, during, and after the passage of the current, a force parameter $C_f(t)$ representative of the clamping force F, for example, the constraint to which an arm 31 of the pliers 3 is subjected. This parameter $C_f(t)$ is subsequently compared to a first threshold $C_{F1}$ during the passage of the current I(t). This force parameter $C_f(t)$ evolves in the course of the various phases of the welding method. During a first period t1, which is called "shoring phase" and during which the electrodes 2a, 2b are moved until they clamp tightly the pile 1 of the parts to be welded, the parameter $C_f(t)$ evolves in an increasing and quick manner.

The shoring phase t1 is followed by a more or less long clamping phase $t_2$ during which the force parameter $C_f(t)$ is constant. The duration of the clamping phase is determined so that the total duration of the shoring phase and of the clamping phase is at least equal to a time interval that the slowest cylinder 4 would need to apply a force corresponding to the shoring threshold $C_{F0}$ to obtain a stabilized clamping. As soon as the clamping force is stabilized, the tension V(t) is applied between the electrodes 2a, 2b. The current I(t) then begins to heat the metallic parts of the pile 1, by Joule effect.

The current I(t) depends on the total electric resistance $R_0(t)$ offered, at a given time, by the pile 1 of parts to be welded. This total electric resistance comprises essentially a component $R_c(t)$, representative of the resistance due to the imperfect mutual contact among the parts of the pile 1, and a component $R_r(t)$ representative of the intrinsic resistance of the material constituting the parts to be welded. The component $R_r(t)$ depends on the temperature of the pile 1. It increases with the temperature of the parts, and thus, it increases as a function of the time which passes from the instant of the first application of the tension V(t). This component decreases only after the end of the application of tension V(t).

The reduction of the total resistance $R_0(t)$ causes an increase of the current I(t), which increases the electric energy dissipated, thus resulting in a sudden temperature increase of the pile 1 of parts to be welded. The time interval during which the tension V(t) is applied to the electrodes 2a, 2b, called volumic expansion phase of the pile of metallic parts 1, is characterized by a sudden dilatation of the pile of metallic parts, which causes an increase of the clamping force F and thus also of the force parameter $C_f(t)$. Commonly, the tension V(t) is cut as soon as the force parameter $C_f(t)$ has crossed a minimal threshold $C_{F1}$ higher than the threshold $C_{F0}$ corresponding to the shoring force.

The cooling of the welding spot which results thereof and which characterizes a solidification phase $t_4$, causes a retraction of the pile of metallic parts 1, triggering in turn a reduction of the clamping force F and thus also a reduction of the force parameter $C_f(t)$.

At the end of the solidification phase T4, i.e., after complete solidification of the pile 1 of parts to be welded, the clamping force is released to enable the movement of the electrodes 2a, 2b toward another location on the pile of parts to be welded.

In order for the force sensor 8 intended to be mounted on the arm 31 of the welding pliers 3 to be able to generate faithfully electric signals representative of the smallest force variations, the sensor 8, which is, in the example described here, equipped with two support blocks 9, is disposed on an interposed part 10 itself disposed on the pliers arm 31, as shown on FIG. 2.

In order to take into account the particular shape of the pliers arm 31 at the location where the sensor must be mounted, the interposed part 10 has two mounting faces, the first of which, referenced 11, is contacted with the sensor 8 and the second of which, referenced 12 or 13, respectively, is intended to be contacted with the welding arm 31. The reference 12 designates the second mounting face of an interposed part 101, which is a variant of the interposed part 10 intended specifically for the fixation of the sensor 8 on a pliers arm 31 having a circular transversal cross-section, as shown on FIG. 3.

The other variant embodiment of the interposed part 10, referenced 102, comprises a second mounting face 13 intended to be contacted with a welding arm 31 equipped, at least over a portion of its length, with a flat 33. This variant is shown on FIG. 4 and can also be understood from FIG. 5 which is described below.

According to the arrangements shown on FIG. 5, a sensor 8 equipped with a cable 8A through which it is connected to the monitoring and control device mentioned above, is mounted on a pliers arm 31 comprising over a portion of its length a flat 33, by means of a supporting part 20. The supporting part 20 has a general shape of an L-shaped collar with two portions, of which an upper portion 21 is intended to receive the sensor 8 and the interposed part 102 formed to be supported on the pliers arm 31 on one side of the arm with respect to its longitudinal axis, and a lower portion 22 is intended to be supported on the pliers arm 31 on the other side with respect to its longitudinal axis. The two portions 21, 22 of the support 20 are connected with each other and clamped on the pliers arm 31 by screws 23 introduced into the portion 22 in the direction of the portion 21 where they engage into corresponding threaded bores 24. The circumferential dimensions of the portions 21 and 22 are selected so as to ensure that, when the two portions are screwed together around a pliers arm 31, a distance e will be maintained between the faces facing each other of these two portions, and an insufficient clamping, caused by one of the two portions 21, 22 being supported on the other, is avoided.

The L-shaped design of the support 20 is selected for the following reason. In the area of the sensor and of its support, the arm behaves like a beam fitted in the zone of contact between the two portions of the support. If there is only one fitting point, such as in the arrangement according to the invention, the deformation is relatively important and easily measurable.

On the contrary, if a T-shaped design were selected, there would be two fitting points and the arm would deform much less, because this would create a bridge between the two ends of the sensor. A portion of the constraints would then be taken up in parallel for the mounting, and would reduce by that amount the sensitivity of the device.

Further, the support 20 comprises a threaded clamping rod 25 engaged in, and cooperating with, a threaded bore 26 provided in the upper portion 21 of the support 20. The clamping rod 25, which comprises two opposed ends, one of which is advantageously equipped with a hexagonal head 27 to simplify its axial movement by screwing with an appropriate tool, is supported on the casing of the sensor 8 to press the sensor 8, via the interposed part 102, against the pliers arm 31.

As shown more particularly on FIG. 6, the clamping rod 25 is equipped at the one of its opposed ends located inside the second portion 21 of the support 20, with a pin 29 or a ring through which the rod 25 is supported on the sensor 8 at the time of mounting the latter on the pliers arm 31. When the sensor 8 is definitely mounted, the position of the rod is secured thanks to a lock nut 28 supported on the first portion 21 of the support 20. The fact of equipping the rod 25 with a pin or ring 29 instead of, for example, a rigid flat head or a spherical end, makes it possible to orient the sensor 8 during the mounting thereof, and to compensate in this way the possible difficulties in positioning the sensor 8 on the pliers arm 31, whatever the reasons for these difficulties. The part 29 is thus simply an interposed part intended to compensate the effects of a potential misalignment between the rod 25 and the sensor 8.

In addition, the use of the pin 29 instead of a fixed part ensures a certain uncoupling between the rotation movement of the rod 25 during mounting of the sensor and the end of the rod 25 which is directly in contact with the sensor 8. This uncoupling constitutes at the same time a sort of protection for the casing of the sensor 8 against damage to the casing by the rod 25 engaging in rotation onto the sensor 8.

FIGS. 7 and 8 represent, in axial view (FIG. 7) and in perspective view (FIG. 8), respectively, a mounting support using an interposed part 101 such as the one shown on FIG. 3 and described by reference to that Figure.

The support 20A is distinguished from the mounting support 20, shown on FIGS. 5 and 6, essentially by the presence of the interposed part 101 instead of the interposed part 102. Indeed, the mounting support 20A is intended for mounting a sensor 8 on a pliers arm 31 having a circular section, for which the interposed part is particularly conformed.

Since the other elements of the support 20A correspond to those of the support 20, the FIG. 7 uses the same references as the corresponding parts of FIG. 6.

The FIGS. 6 and 10 show the supports 20A and 20 of FIG. 8 and of FIG. 5, respectively, in a perspective view in the position mounted on the pliers arm 31. Each of these Figures uses the same references for the same elements of the support under consideration. It will be noted more particularly on FIG. 10 that a strap is used to secure the sensor from being lost during manipulations.

The invention claimed is:

1. Welding device comprising:
   pliers arms holding electrodes, wherein the pliers arms apply a clamping force to the electrodes and a welding current passes through the electrodes,
   a force sensor mounted on at least one of the pliers arms, said force sensor being equipped with two support blocks on a side facing a surface of the pliers arm on which the force sensor is mounted,
   an interposed part disposed between the pliers arm and the force sensor,
   a mounting support having a general shape of an L, said support having a first branch and a second branch,
   wherein the first branch of the L-shaped support bears a collar clamping the pliers arm at a first location along a longitudinal axis of the pliers arm, said collar having an upper portion and a lower portion, wherein the upper portion is supported on the pliers arm on one side of the arm with respect to its longitudinal axis, and the lower portion is supported on the pliers arm on another side with respect to its longitudinal axis, and
   wherein the second branch of the L-shaped support extends from the first branch in a direction of the longitudinal axis of the pliers arm and holds the sensor on the pliers arm in a second location different from the first location along the longitudinal axis of the pliers arm, said second branch having a threaded bore in which a threaded clamping rod is engaged so that the clamping rod presses the sensor against the pliers arm via the interposed part,
   wherein the collar clamping the pliers arm constitutes the only securement of the mounting support along the longitudinal axis of the pliers arm.

2. Welding device according to claim 1, wherein the interposed part is made in a material whose hardness is intermediate between the hardness of the pliers arm and the hardness of the sensor.

3. Welding device according to claim 1, wherein the interposed part is made in a material whose hardness is in the order of 350 to 450 $HV_{0.3}$.

4. Welding device according to claim 1, wherein the interposed part is an essentially flat element, having two opposed mounting faces, of which the first one is intended to be contacted with the sensor and the second one is intended to be contacted with the pliers arm, each of these two mounting faces having a complementary shape with respect to the shape of the pliers arm and of the sensor, respectively, to obtain a shape adaptation between the arm and the sensor.

5. Welding device according to claim 1, wherein the interposed part is made in a material whose hardness is in the order of about 400 $HV_{0.3}$.

6. Welding device according to claim 1, wherein the clamping rod is equipped with a ring through which the clamping rod is supported on the sensor, so as to enable an orientation of the sensor during mounting.

7. Welding device according to claim 1, wherein the clamping rod is secured in position with a lock nut.

8. Welding device according to claim 1, wherein the interposed part is designed specifically for each diameter of the pliers arm.

9. Welding device according to claim 1, wherein the interposed part is adaptable to several diameters of the pliers arm.

10. Welding device according to claim 1, wherein the second branch of the L-shaped support has a groove extending in a direction of the longitudinal axis of the pliers arm, a portion of the sensor being located in the groove.

11. Method of mounting a force sensor on a pliers arm, which comprises the following steps:
    preparing the surface of the pliers arm in the location where the sensor will be disposed,
    disposing an interposed part on the pliers arm and the sensor on the interposed part,
    mounting the interposed part and the sensor on the pliers arm with a mounting support,
    wherein the mounting support has a general shape of an L, said support having a first branch and a second branch,
    wherein the first branch of the L-shaped support bears a collar clamping the pliers arm at a first location along a longitudinal axis of the pliers arm, said collar having an upper portion and a lower portion, wherein the upper portion is supported on the pliers arm on one side of the arm with respect to its longitudinal axis, and the lower portion is supported on the pliers arm on the other side with respect to its longitudinal axis, and
    wherein the second branch of the L-shaped support extends from the first branch in a direction of the longitudinal axis of the pliers arm and holds the sensor on the pliers arm in a second location different from the first location along the longitudinal axis of the pliers arm, said second branch having a threaded bore in which a threaded clamping rod is engaged so that the clamping rod presses the sensor against the pliers arm via the interposed part,
    wherein the collar clamping the pliers arm constitutes the only securement of the mounting support along the longitudinal axis of the pliers arm.

12. Method according to claim 11, wherein the interposed part is made in a material whose hardness is intermediate between the hardness of the pliers arm and the hardness of the sensor.

13. Method according to claim 11, wherein the interposed part is made in a material whose hardness is in the order of 350 to 450 $HV_{0.3}$.

14. Method according to claim 11, wherein the interposed part is an essentially flat element, having two opposed mounting faces, of which the first one is intended to be contacted with the sensor and the second one is intended to be contacted with the pliers arm, each of these two mounting faces having a complementary shape with respect to the shape of the pliers arm and of the sensor, respectively, to obtain a shape adaptation between the arm and the sensor.

15. Method according to claim 11, wherein the interposed part is made in a material whose hardness is in the order of about 400 $HV_{0.3}$.

16. Method according to claim 11, wherein the rod is equipped with a pin or ring through which the rod is supported on the sensor, so as to enable an orientation of the sensor during mounting.

17. Method according to claim 11, wherein the clamping rod is secured in position with a lock nut.

18. Method according to claim 11, wherein the interposed part is designed specifically for each diameter of the pliers arm.

19. Method according to claim 11, wherein the interposed part is adaptable to several diameters of the pliers arm.

20. Method according to claim 11, wherein the second branch of the L-shaped support has a groove extending in a direction of the longitudinal axis of the pliers arm, a portion of the sensor being located in the groove.

* * * * *